Apr. 24, 1923.  
W. R. MORTON  
SHOCK ABSORBER  
Filed Nov. 4, 1921  
1,452,568

Inventor  
W. R. Morton  
By Geo. P. Kimmel  
Attorney

Patented Apr. 24, 1923.

1,452,568

UNITED STATES PATENT OFFICE.

WILLIAM R. MORTON, OF HAVRE, MONTANA, ASSIGNOR OF ONE-HALF TO VICTOR R. GRIGGS, OF HAVRE, MONTANA.

SHOCK ABSORBER.

Application filed November 4, 1921. Serial No. 512,792.

*To all whom it may concern:*

Be it known that I, WILLIAM R. MORTON, a citizen of the United States, residing at Havre, in the county of Hill and State of Montana, have invented certain new and useful Improvements in Shock Absorbers, of which the following is a specification.

This invention relates to shock absorbers for automobiles.

The object of the invention is to provide a simply constructed, cheap and efficient device of this character for use on light automobiles such as Ford, Dodge, Chevrolet, Maxwell and the like, which may be readily applied and which will completely absorb all shocks and jars incident to travelling over rough roads and be manufactured at a minimum cost.

With these and other objects in view, the invention consists in certain novel features of construction as hereinafter shown, described and claimed.

In the accompanying drawings:—

In the embodiment illustrated, the shock absorber constituting this invention is shown applied to the chassis of a Ford automobile and comprises a channel bar 1, adapted to be located between the side bars F and F' of the chassis adjacent the differential, and which is secured to said side bars by bolting or otherwise.

Figure 1:
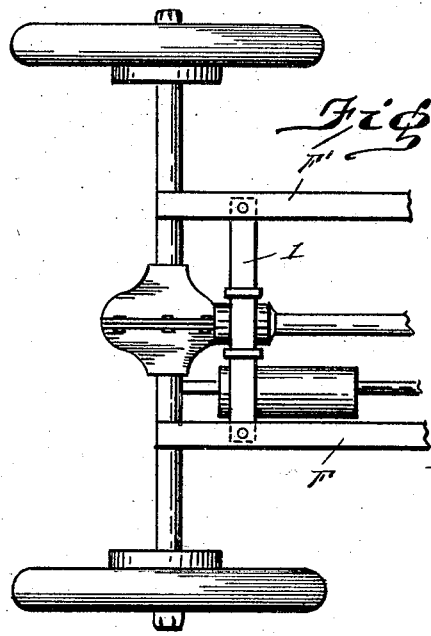
Figure 1 represents a plan view of the rear end of an automobile chassis showing this improved shock absorber applied.
Figure 2:
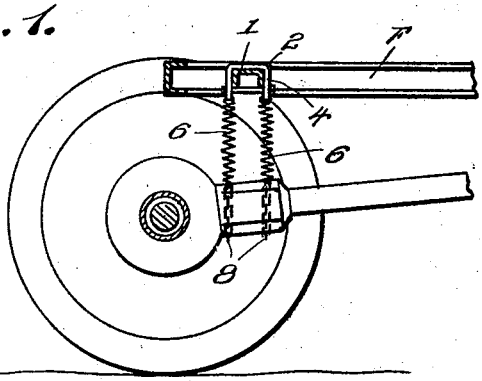
Fig. 2 is a detail longitudinal section thereof.
Figure 3:
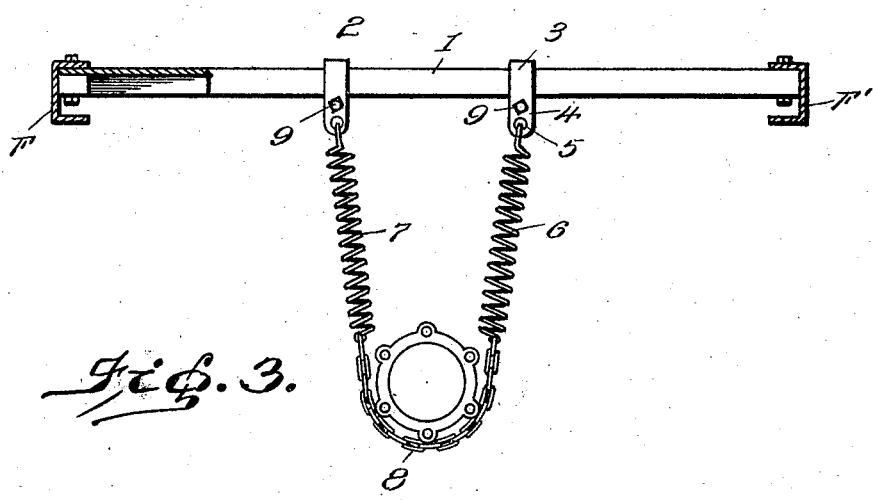
Fig. 3 is a transverse section of the chassis with this improved shock absorber shown in side elevation, with parts broken out and in section.

Carried by the bar 1, are two longitudinally spaced suspension elements 2 and 3, here shown of inverted U-shape in form to fit over the channel bar 1. The legs 4 of these elements extend below the angle bar 1, and are apertured as shown at 5, for the reception of one end of coiled springs 6 and 7, the lower ends of which are connected by a chain 8, and form stirrup-like devices. Two of these springs are used in connection with each suspension element, as is shown clearly in Fig. 2. The chains 8 extend under the housing of the drive shaft just in front of the differential and the springs connected with the chains separate to absorb the shock of the car and prevent transmission thereof to the occupants of the car.

The suspension elements 2 and 3 are secured to the bar 1, preferably by bolts 9, which extend through the legs of each clip directly below the bar 1, and hold the extension element in assembled position.

From the above description it will be obvious that the shock absorber constituting this invention is composed of a minimum number of parts which may be easily and quickly applied to the frame of any automobile simply by drilling bolt holes in the side bars of the frame for the connection of the bar 1 thereto.

One end of each of the springs is then unhooked from its suspension elements and passed under the housing of the drive shaft and then re-engaged with the suspension elements so that jars and shocks imparted to the rear end of the car will be absorbed by the four springs carried by the bar 1.

The preferred embodiment of the invention is disclosed in the drawings and set forth in the specification, but it will be understood that any modifications within the scope of the claimed invention may be made in the construction without departing from the principle of the invention or sacrificing any of its advantages.

I claim:—

A shock absorber for motor vehicles comprising a transversely extending bar adapted to be connected with the chassis of a vehicle forwardly of and in close proximity to the differential housing of the vehicle, a pair of spaced inverted yoke-shaped suspension elements fixed to said bar, a pair of expansible and contractile members depending from and having their upper ends connected to the legs of each of said elements, and a pair of spaced flexible members adapted to extend around the housing of the drive shaft of the vehicle and each having one end connected to the lower end of one of the expansible and contractile members depending from a suspension element, and its other end connected to the lower end of an expansible and contractile member depending from the other suspension element.

In testimony whereof, I affix my signature hereto.

WILLIAM R. MORTON.